(12) United States Patent
Mohebbi et al.

(10) Patent No.: US 7,007,155 B2
(45) Date of Patent: Feb. 28, 2006

(54) DIGITAL SIGNAL PROCESSOR FOR WIRELESS BASEBAND PROCESSING

(75) Inventors: Behzad Barjesteh Mohebbi, Tustin, CA (US); Fadi Joseph Kurdahi, Irvine, CA (US)

(73) Assignee: Morpho Technologies, Irvine, CA (US)

( * ) Notice: Subject to any disclaimer, the term of this patent is extended or adjusted under 35 U.S.C. 154(b) by 447 days.

(21) Appl. No.: 10/246,366

(22) Filed: Sep. 17, 2002

(65) Prior Publication Data
US 2003/0108119 A1 Jun. 12, 2003

Related U.S. Application Data

(60) Provisional application No. 60/323,763, filed on Sep. 17, 2001.

(51) Int. Cl.
*G06F 15/173* (2006.01)
(52) U.S. Cl. .......................................... 712/35; 712/10
(58) Field of Classification Search ................. 712/35, 712/10, 15, 225
See application file for complete search history.

(56) References Cited

U.S. PATENT DOCUMENTS

| | | | |
|---|---|---|---|
| 5,056,000 A | | 10/1991 | Chang |
| 5,613,146 A | | 3/1997 | Gove et al. |
| 5,649,198 A | * | 7/1997 | Shibata et al. ............... 718/100 |
| 5,742,265 A | * | 4/1998 | Stoller et al. .................. 345/60 |
| 6,425,026 B1 | * | 7/2002 | Morris et al. ................ 710/100 |
| 6,662,331 B1 | * | 12/2003 | Kang .......................... 714/755 |
| 6,778,513 B1 | * | 8/2004 | Kasapi et al. ............... 370/330 |

OTHER PUBLICATIONS

PCT—International Search Report for Application No. PCT/US 02/29490—Mar. 22, 2004.
Guangming Lu et al., "The MorphoSys Dynamically Reconfigurable System-On-Chip" Evolvable Hardware, 1999. Proceedings of the First NASA/DOD Workshop on Pasadena, CA USA Jul. 19-21, 1999, Los Alamitos, CA USA, IEEE Comput. Soc. US, Jul. 19, 1999, pp. 152-160.
Shin'ichiro Okazaki et al., A Compact Real Time Vision System Using Integrated Memory Array Processor Architecture, IEEE Transactions on Circuits and Systems for Video Technology, vol. 5, No. 5, Oct. 1995.

* cited by examiner

*Primary Examiner*—Eric Coleman
(74) *Attorney, Agent, or Firm*—DLA Piper Rudnick Gray Cary US LLP

(57) ABSTRACT

A circuit employing an array of reconfigurable processing elements for wireless baseband processing. The circuit includes a first linear array of reconfigurable processing elements for processing signals from a first channel, and a second linear array of reconfigurable processing elements, coupled in parallel with the first linear array of reconfigurable processing elements, for processing signals from a second channel that is concurrent with the first channel. The circuit also includes a frame buffer array having a number of frame buffers that corresponds to a number of reconfigurable processing elements in the first and second linear arrays of processing elements. A point-to-point data bus is connected between each reconfigurable processor and an associated frame buffer. A shared data bus is connected between the first and second linear arrays of reconfigurable processing elements and the frame buffer array.

17 Claims, 6 Drawing Sheets

DIGITAL SIGNAL PROCESSOR FOR WIRELESS BASEBAND PROCESSING

BACKGROUND

This patent application claims priority from U.S. Provisional Patent Application No. 60/323,763, filed Sep. 17, 2001.

This patent application describes inventions related to a novel digital signal processor (DSP) architecture for third generation and beyond (3G+) wireless baseband processing. DSPs are programmable microcomputers whose hardware, software and instruction sets are optimized for high-speed numeric processing applications. DSPs are widely used in wireless communication systems for various applications such as speech encoder/decoders (CODECs), channel equalizers, MAC layer operation and system controllers.

Where possible, DSPs are preferred to other devices such as application specific integrated circuits (ASICs) and field programmable gate arrays (FPGAs) due to the DSPs inherent flexibility and ease of programming. With the advent of software defined radio (SDR) and the convergence of global wireless markets, new impetus has been given to programmable and flexible radio architectures that can support a variety of wireless standards. Therefore, programmable DSPs are increasingly used in wireless systems; with ever-increasing need to expand their application range to such computation-intensive areas as the baseband processing of the transmitter/receiver chain. However, the baseband units of the emerging 3G Wireless systems such as WCDMA require processing power that is not provided by any currently known DSP architectures.

Tremendous efforts are being put in designing the next generation DSPs to meet the growing processing demand of wireless applications. Many new multiprocessing architectures are used to increase the processing power of DSPs. Some of the examples of such architectures are Pipeline single-instruction multiple-data (SIMD), multiple-instructions multiple-Date (MIMD), and SIMD with array processing. These architectures are for the most part targeted at applications with inherent data-parallelism, high regularity, and high throughput requirements. In a wireless terminal, or handset, these applications include baseband processing, video compression (discrete cosine transforms, motion estimation), data encryption, and DSP transforms.

One problem is that conventional DSPs, once programmed, are not easily reconfigurable to handle a variety of applications, nor are they flexible enough for applications that process irregular or nonparallel data.

FIG. 1 is a simplified block diagram of a reconfigurable DSP (rDSP) chip designed by Morpho Technologies, Inc., of Irvine Calif. and the assignees hereof, which overcomes some of the shortcomings of conventional DSPs. The rDSP comprises a reconfigurable processing unit, a general-purpose reduced instruction set computer (RISC) processor and a set of I/O interfaces, all implemented as a single chip. At the center of the chip is an array of reconfigurable processing elements, also known as reconfigurable cells (RCs). Since most of the target applications possess word-level granularity, the RCs are also coarse-grain but also provide extensive support for key bit-level functions. The RISC processor controls the operation of the RC fabric. A set of input/output (I/O) interfaces handles data transfers between external devices and the rDSP chip. Dynamic reconfiguration of the RC fabric is done in one cycle by caching on the chip several contexts from the off-chip memory.

FIG. 2 illustrates an rDSP chip 200 in greater detail, showing: the RISC processor with its associated instruction, data cache and memory controller; an RC array comprised of an 8-row by 8-column array of RCs; a context memory (CM); a frame buffer (FB); and a direct memory access (DMA) with its coupled memory controller. Each RC has several functional units (e.g. MAC, ALU, etc.) and a small register file, and is configured through a 32-bit context word.

The FB is analogous to an internal data cache for the RC array, and is implemented as a two-port memory. It makes the memory accesses transparent to the RC array by overlapping computation processes with data load and store processes. The FB is organized as 8 banks of N×16 frame buffer cells, where N can be sized by the a developer. The FB can thus provide 8 RCs (1 row or 1 column) with data, either as two 8-bit operands or one 16-bit operand, on every clock cycle.

The CM is the local memory to store the configuration contexts of the RC array, much like an instruction cache. A context word from a context set is broadcast to all eight RCs in a row or column. All RCs in a row (or column) share a context word and perform the same operation, as shown in FIG. 3. Thus the RC array can operate in Single Instruction, Multiple Data form (SIMD). For each row and each column there are 256 context words that can be cached on the chip. The context memory has a 2-port interface, which enables the loading of new contexts from off-chip memory (e.g. flash memory) during execution on the RC array.

RC cells in the array can be connected in two levels of hierarchy. First, RCs within each quadrant of 4×4 RCs are fully connected in a row or column. Furthermore, RCs in adjacent quadrants are connected via fast lanes, which enable an RC in a quadrant to broadcast its results to the RCs in the adjacent quadrant.

The RISC processor handles general-purpose operations and also controls operation of the RC array. It initiates all data transfers to and from the FB, and configuration loads to the CM through the DMA Controller. When not executing normal RISC instructions, the RISC processor controls the execution of operations inside the RC array every cycle by issuing special instructions, which broadcast SIMD contexts to RCs or load data between the frame buffer and the RC array. This makes programming simple since one thread of control flow is running through the system at any given time.

The structure of the 8×8 RC array is optimized for two-dimensional symmetric operations, such as image processing. However, this structure is not optimal for some other operations, such as wireless baseband modem algorithms. These other operations lead to underutilization of some of the array elements and/or data movement bottlenecks. Most CDMA modem algorithms require high initial data throughput, followed by low output data movement (i.e. dispreading). In contrast, high-order modulations used in systems such as 802.11a (64 QAM), require higher data bandwidth at the output of the array after demodulation and detection. In both cases, a high data bandwidth is required to/from the RC array.

As discussed above, large data bandwidth is essential for most wireless modem applications. For example, WCDMA voice channel (30 kbit/s) has a spreading of 256. This effectively means that for every data symbol that is generated after 256 Multiply-Add-Accumulate (MAC) operations (nearly 4 clock cycles), 256 data samples need to be loaded into the RC array (32 clock cycle). So data movement overhead for dispreading is nearly 700%.

What is needed is a new reconfigurable processing architecture for wireless baseband processing. Preferably, such an architecture would utilize the same hardware resource of 64 RC cells, a given frame buffer size, and other structures that are found in the current reconfigurable processor design.

SUMMARY OF THE INVENTION

In one embodiment, a wireless baseband processing circuit includes a first linear array of reconfigurable processing elements for processing signals from a first channel, and a second linear array of reconfigurable processing elements, coupled in parallel with the first linear array of reconfigurable processing elements, for processing signals from a second channel that is concurrent with the first channel. The circuit also includes a frame buffer array having a number of frame buffers that corresponds to a number of reconfigurable processing elements in the first and second linear arrays of processing elements. The circuit also includes a point-to-point data bus connected between each reconfigurable processor and an associated frame buffer, and a shared data bus connected between the first and second linear arrays of reconfigurable processing elements and the frame buffer array.

In another embodiment, a wireless baseband processing circuit includes a plurality of reconfigurable processing elements arranged in a two-dimensional array and connected together by a first data bus arrangement. The circuit also includes a plurality of frame buffers arranged in the two-dimensional array and connected together by the first data bus arrangement. Each reconfigurable processing element is connected to a frame buffer in a third dimension by a second data bus arrangement.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
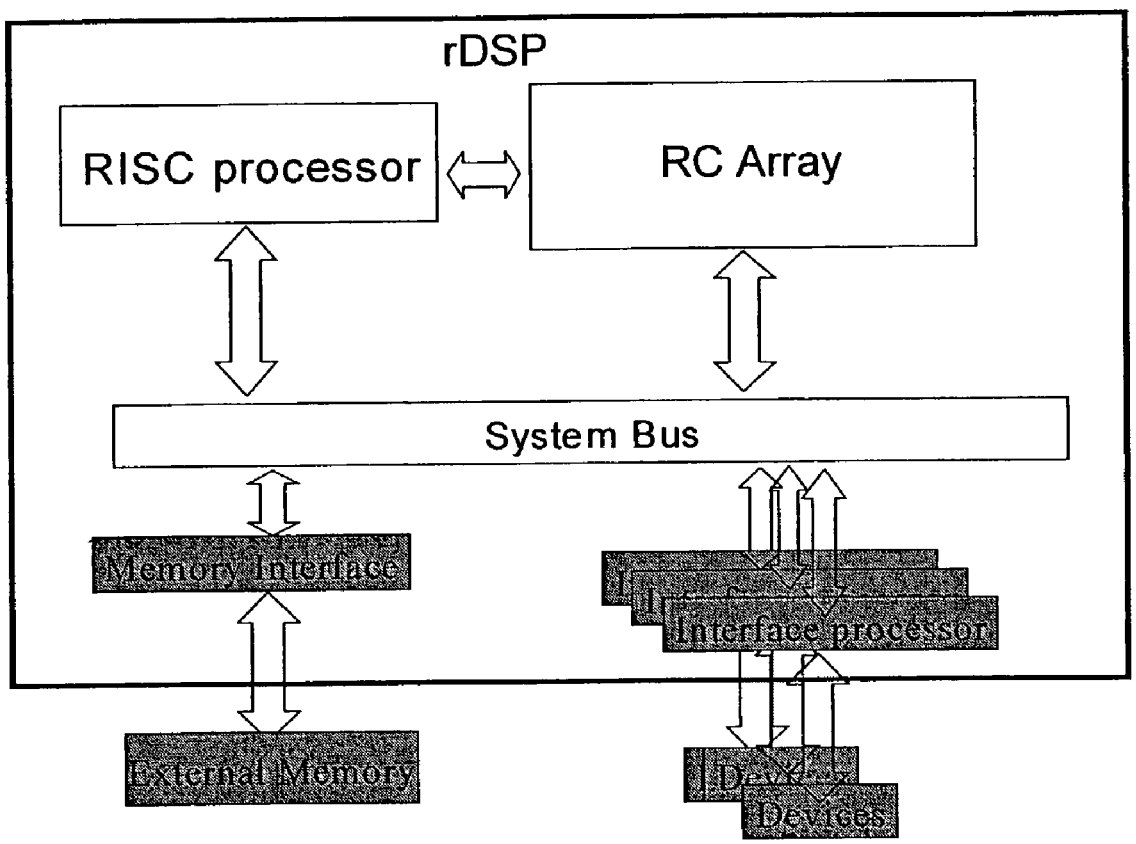
FIG. 1 illustrates a simplified block diagram of a prior art reconfigurable DSP architecture.
Figure 2:
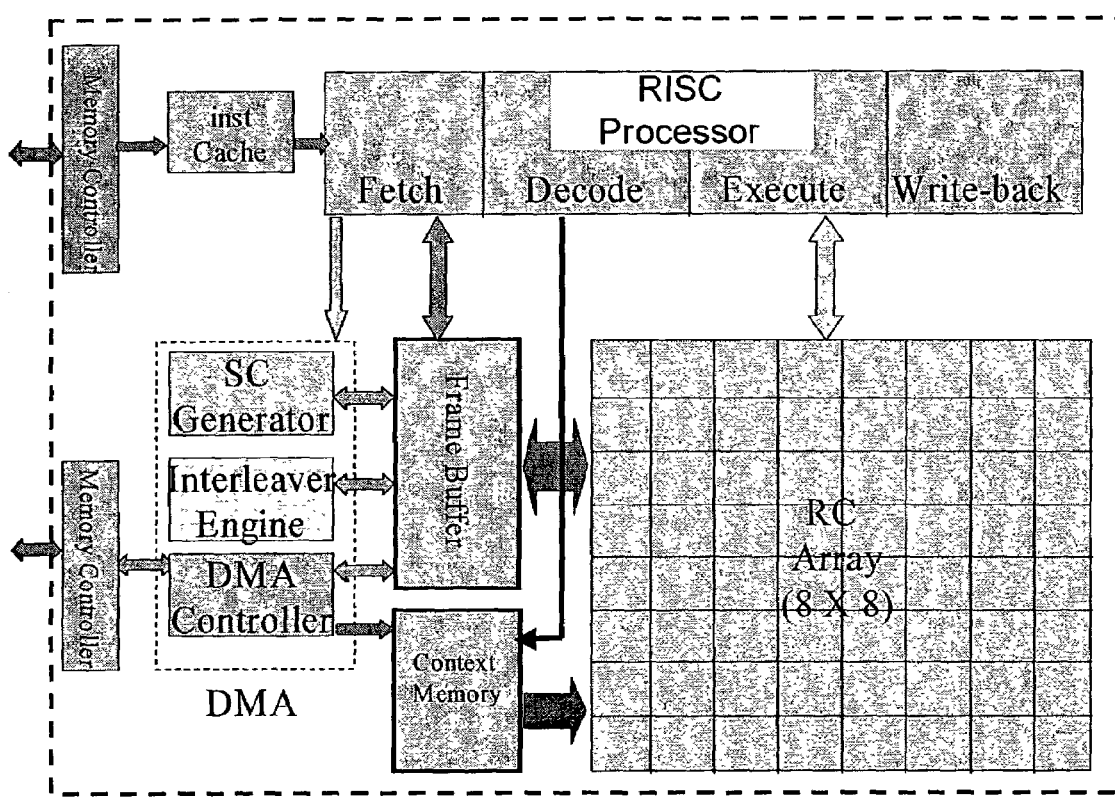
FIG. 2 illustrates the prior art reconfigurable DSP architecture in greater detail.
Figure 3:
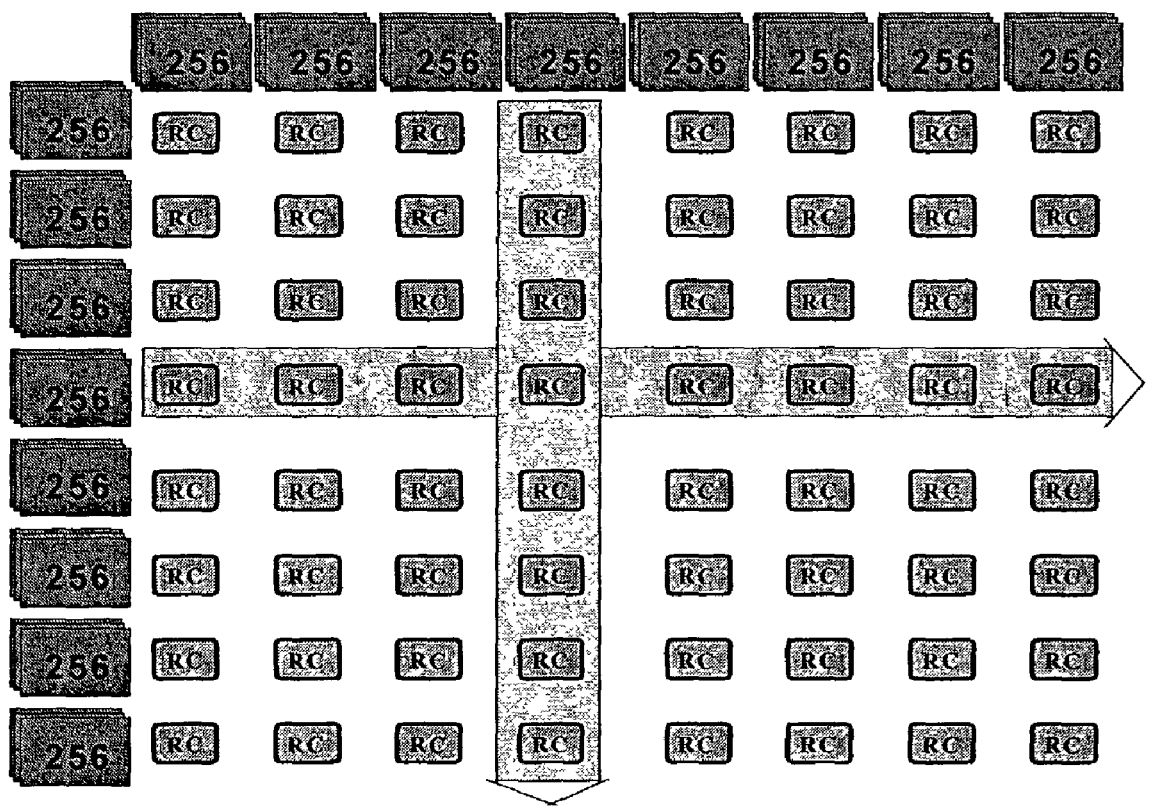
FIG. 3 illustrates a method of configuring the prior art reconfigurable DSP.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

Figure 4:
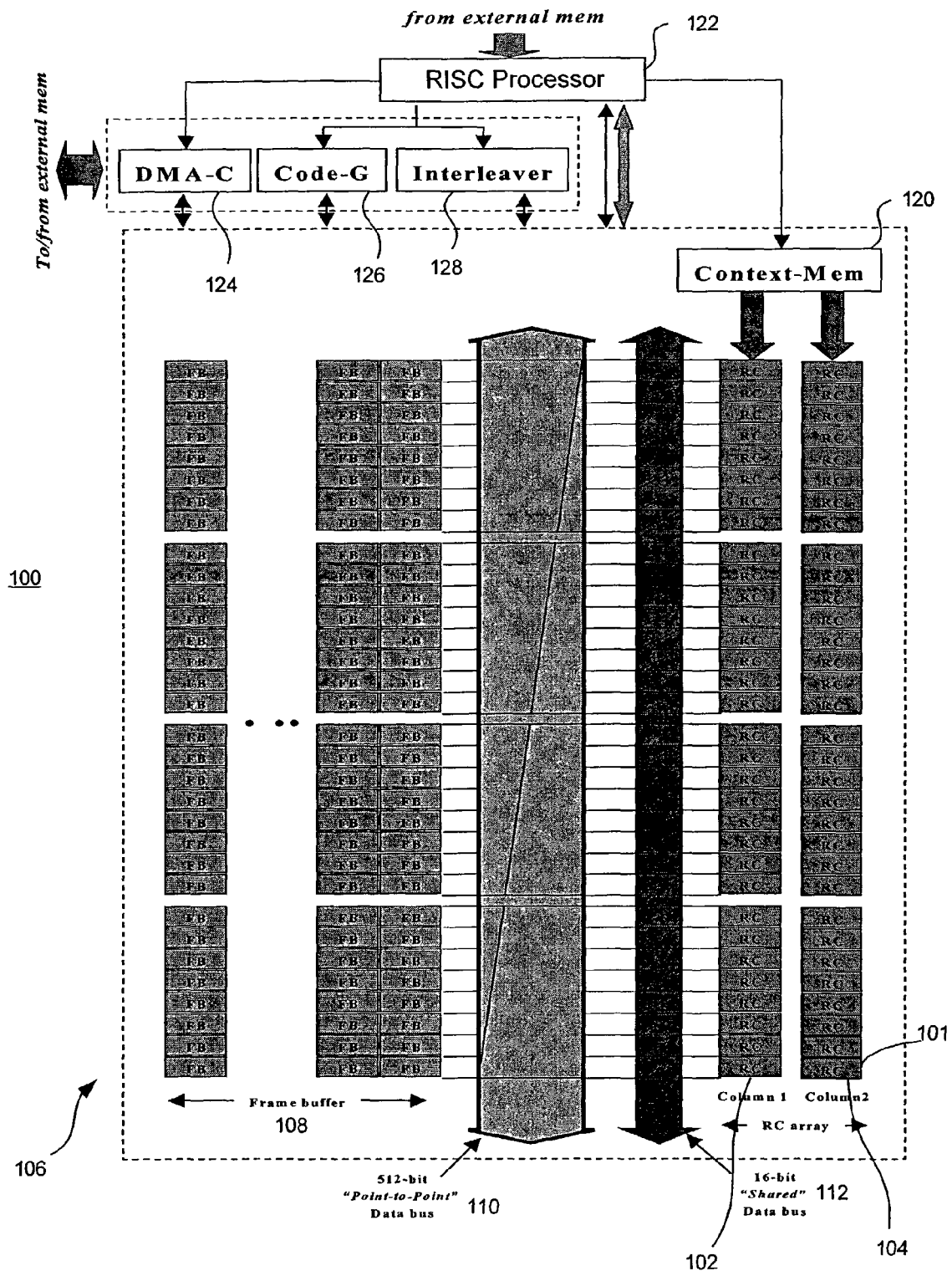
FIG. 4 illustrates an embodiment of a reconfigurable DSP for wireless baseband processing.

FIG. 4 shows a reconfigurable circuit 100 for baseband processing applications. The circuit 100 includes a first linear array 102 of reconfigurable processing elements 101 and a second linear array 104 of reconfigurable processing elements 101. The second linear array 104 is coupled in parallel with the first linear array 102. The processing elements 101 in the first and second linear arrays 102 and 104 are interconnected so that all of the reconfigurable processing elements 101 in an array can be loaded with an instruction in one clock cycle.

The circuit 100 also includes a frame buffer array 106 having a number of frame buffers 108 that corresponds to a number of reconfigurable processing elements 101 in the first and second linear arrays 102, 104 of reconfigurable processing elements 101. A point-to-point data bus 110 connects each reconfigurable processor 101 and an associated frame buffer 108 for "bulk" data transfers. A shared data bus 112 connects the first and second linear arrays 102 and 104 of reconfigurable processing elements 101 with the frame buffer array 106.

For most applications such as downlink receiver of WCDMA system, at least two concurrent channels, such as a common pilot channel (CPICH) and a dedicated physical channel (DPCH) need to be detected and processed. In other applications, a level of pipeline operation is also needed, which cannot be provided by a single column of processors. The circuit 100 provides the highest data bandwidth possible (i.e. up to 102 Gbits/s) with a 512-bit sized point-to-point data bus 110. In an embodiment, the first linear array 102 is used for processing the CPICH, and the second linear array 104 is used for processing the DPCH. Note that if more concurrent channels are needed, more linear arrays of reconfigurable processing elements 101 can be employed.

In an embodiment shown in FIG. 4, the point-to-point data bus 110 is a 512-bit data bus, and the shared data bus 112 is a 16-bit data bus. The 16-bit data bus enables each reconfigurable processing element 101 to access any memory location in the frame buffer array 106, albeit in a sequential manner. The 512-bit data bus can have a fixed access structure for bulk data transfer, or can be coupled to the processing arrays 102, 104 via an "Omega" network, to facilitate a more versatile access mechanism, including an arbitrary fixed offset access capability. The circuit 100 also includes a context memory 120 for providing a context instruction to the first and second linear arrays 102 and 104, as well as a RISC processor 122 for controlling the context memory 120. The RISC processor 122 also controls a DMA controller 124, a code generator 126, and an interleaver 128 for full baseband processing.

Figure 5:
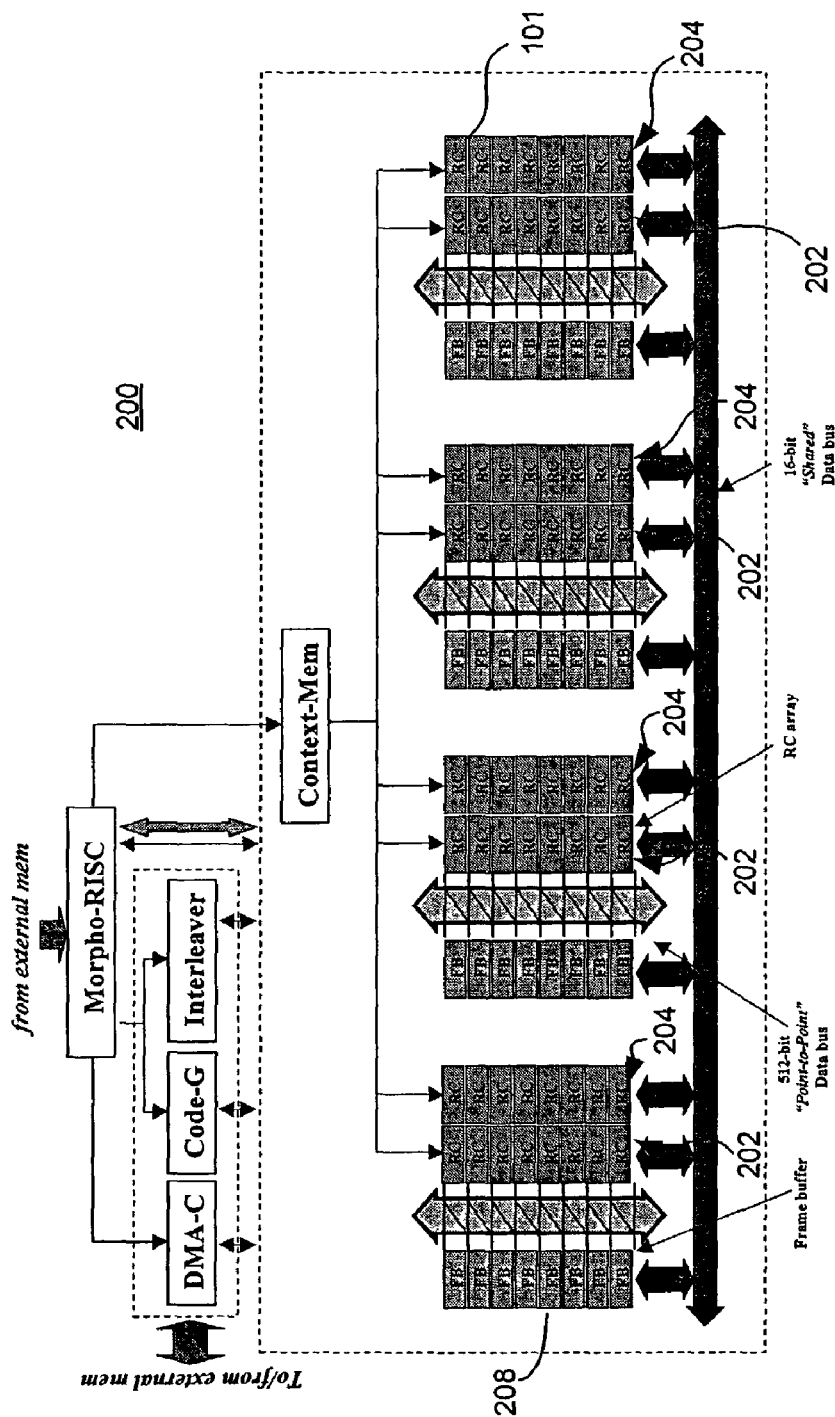
FIG. 5 illustrates another embodiment of a reconfigurable DSP for wireless baseband processing.

FIG. 5 shows a baseband processing circuit 200 according to an alternative embodiment. The circuit 200 includes a first set 202 of linear arrays of reconfigurable processing elements 101, and a second set 204 of linear arrays of reconfigurable processing elements. The first and second sets 202 and 204 may include a number of parallel linear arrays, or sub-arrays, of reconfigurable processing elements, and preferably two or more sub-arrays. The sub-arrays are interleaved with a frame buffer array 206 having a number of frame buffers that corresponds to a number of reconfigurable processing elements 101 in the first and second sets 202 and 204. Accordingly, the frame buffer array may be arranged as a similar number of sub-arrays of frame buffers 208. Again, each frame buffer 208 may include any number of individual frame buffer cells.

A point-to-point data bus 210 is connected between the first and second sets 202 and 204, and a sub-array of the frame buffer array 206. A shared data bus 212 connects the first and second sets 202, 204 with the frame buffer array 206. The circuit 200 includes other components similar to the circuit 100 shown in FIG. 4.

Figure 6:
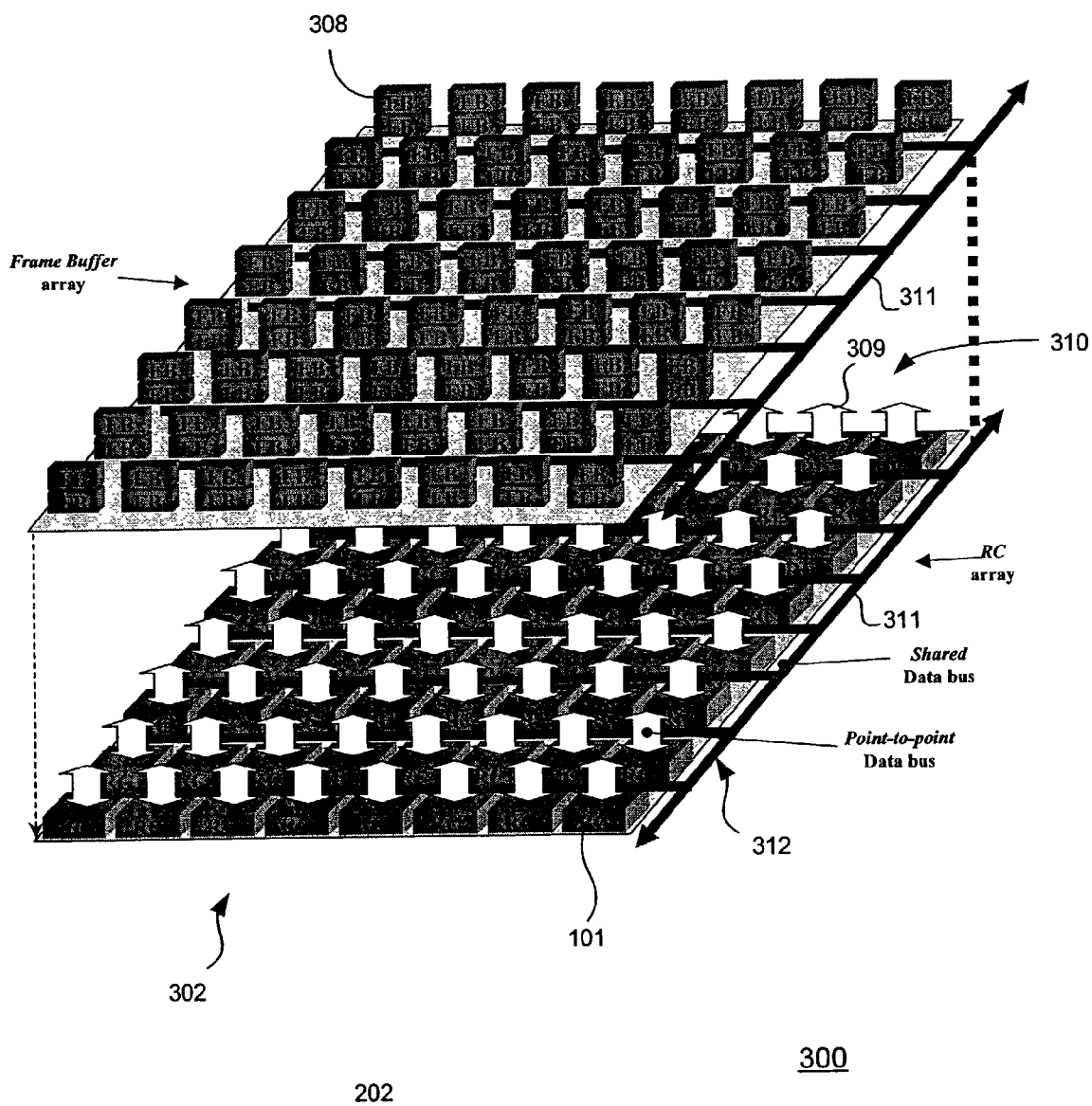
FIG. 6 illustrates yet another embodiment of a reconfigurable DSP for wireless baseband processing.

FIG. 6 shows a baseband processing circuit 300 arranged in a three dimensional configuration (but not showing other units such as the context memory, RISC processor, etc.). The circuit 300 includes a plurality of reconfigurable processing elements 101 generally arranged in a two-dimensional array 302 and connected together by a first data bus arrangement 312. The circuit 300 also includes a plurality of frame buffers 308 also generally arranged in the two-dimensional array 306 and connected together by the first data bus arrangement 312. Each frame buffer 308 may include a plurality of stacked frame buffer cells. Each reconfigurable processing element 101 is connected to a frame buffer 308 in a third dimension (i.e. not a dimension of both two-dimensional arrays 302 and 306) by a second data bus arrangement 310. The first data bus arrangement 312 includes a plurality of shared two-dimensional data busses 311. The second data bus arrangement 312 includes a plurality of point-to-point data busses 309.

The three-dimensional (3D) configuration of circuit 300 can provide a maximum data bandwidth of 205 Gbits/s, with each reconfigurable processing element 101 having a 16-bit dedicated point-to-point data bus. The circuit 300 may also utilize Controlled Collapse Chip Connection (C4) solder bump technology to enable the 3D structure. The circuit 300 may also be modified to have one dedicated point-to-point data bus 309 for each pair of reconfigurable processing elements 101.

Those having skill in the art would recognize that the bus and array sizes described above are merely for example, can be modified for optimum performance for different algorithms, and are not to be construed as limiting the following claims in any way. While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A wireless baseband processing circuit, comprising:
a first linear array of reconfigurable processing elements for processing signals from a first channel;
a second linear array of reconfigurable processing elements, coupled in parallel with the first linear array of reconfigurable processing elements, for processing signals from a second channel that is concurrent with the first channel;
a frame buffer army having a number of frame buffers that corresponds to a number of reconfigurable processing elements in the first and second linear arrays of processing elements;
a point-to-point data bus connected between each reconfigurable processor and an associated frame buffer; and
a shared data bus connected between the first and second linear arrays of reconfigurable processing elements and the frame buffer array.

2. The circuit of claim 1, further comprising a context memory connected to the first and second linear arrays of reconfigumble processing elements.

3. The circuit of claim 2, further comprising a reduced instruction set computer processor connected to control the context memory.

4. The circuit of claim 3, further comprising:
a direct memory access controller
a code generator; and
an interleaver,
wherein the direct memory access controller, the code generator, and the interleaver are responsive to the reduced instruction set computer processor for controlling the first and second arrays of reconfigurable processing elements.

5. The circuit of claim 1, wherein the frame buffer array is interleaved with the first and second linear arrays of reconfigurable processing elements.

6. A wireless baseband processing circuit, comprising:
a first set of linear arrays of reconfigurable processing elements for processing signals from a first channel;
a second set of linear arrays of reconfigurable processing elements for processing signals from a second channel that is concurrent with the first channel;
a frame buffer array having a number of frame buffers that corresponds to a number of reconfigurable processing elements in the first and second sets of linear arrays of processing elements, wherein the frame buffer array is interleaved with the first and second sets of linear arrays of reconfigurable processing elements;
a point-to-point data bus connected between each reconfigurable processor and an associated frame buffer; and
a shared data bus connected between the first and second sets of linear arrays of reconfigurable processing elements and the frame buffer array.

7. The circuit of claim 6, wherein each frame buffer includes one or more frame buffer cells.

8. The circuit of claim 6, further comprising a context memory connected to the first and second linear arrays of reconfigurable processing elements.

9. The circuit of claim 8, further comprising a reduced instruction set computer processor connected to control the context memory.

10. The circuit of claim 9, further comprising:
a direct memory access controller;
a code generator; and
an interleaver,
wherein the direct memory access controller, the code generator, and the interleaver are responsive to the reduced instruction set computer processor for controlling the first and second arrays of reconfigurable processing elements.

11. A wireless baseband processing circuit comprising:
a plurality of reconfigurable processing elements arranged in a two-dimensional array and connected together by a first data bus arrangement;
a plurality of frame buffers arranged in the two-dimensional array and connected together by the first data bus arrangement,
wherein each reconfigurable processing element is connected to a frame buffer in a third dimension by a second data bus arrangement.

12. The circuit of claim 11, wherein the first data bus arrangement includes a plurality of shared two-dimensional data busses.

13. The circuit of claim 12, wherein the second data bus includes a plurality of point-to-point data busses.

14. The circuit of claim 13, wherein the second data bus arrangement is configured for bulk data transfer between the plurality of reconfigurable processing elements and the plurality of frame buffers.

15. The circuit of claim 11, further comprising a context memory connected to the two-dimensional array of reconfigurable processing elements.

16. The circuit of claim 15, further comprising a reduced instruction set computer processor connected to control the context memory.

17. The circuit of claim 16, further comprising:
a direct memory access controlled;
a code generator; and
an interleaver,
wherein the direct memory access controller, the code generator, and the interleaver are responsive to the reduced instruction set computer processor for controlling the first and second arrays of reconfigurable processing elements.

* * * * *